United States Patent [19]
Jaeger et al.

[11] Patent Number: 5,902,841
[45] Date of Patent: *May 11, 1999

[54] USE OF HYDROXY-FUNCTIONAL FATTY AMIDES IN HOT MELT INK JET INKS

[75] Inventors: C. Wayne Jaeger, Beaverton; Donald R. Titterington, Tualatin, both of Oreg.; Loc V. Bui, Valencia, Calif.

[73] Assignee: Tektronix, Inc., Wilsonville, Oreg.

[*] Notice: This patent is subject to a terminal disclaimer.

[21] Appl. No.: 08/792,207

[22] Filed: Jan. 31, 1997

Related U.S. Application Data

[63] Continuation-in-part of application No. 08/381,610, Jan. 30, 1995, Pat. No. 5,621,022, which is a continuation-in-part of application No. 08/231,598, Apr. 22, 1994, abandoned, which is a division of application No. 07/981,677, Nov. 25, 1992, Pat. No. 5,372,852.

[51] Int. Cl.$^6$ .................................................. C09D 11/10
[52] U.S. Cl. ......................... 523/161; 524/478; 524/479; 524/487; 524/488; 106/31.13; 106/31.27
[58] Field of Search ............................ 523/161; 524/478, 524/479, 487, 488; 106/20 R, 22 R

[56] References Cited

U.S. PATENT DOCUMENTS

| Re. 34,029 | 8/1992 | Ball ............................................ 347/88 |
| 4,484,948 | 11/1984 | Merritt et al. ........................ 106/31.3 |
| 4,830,671 | 5/1989 | Frihart et al. ........................ 106/31.29 |
| 5,286,288 | 2/1994 | Tobias et al. ........................ 106/31.29 |
| 5,350,789 | 9/1994 | Sagawa et al. ........................ 524/313 |
| 5,354,368 | 10/1994 | Larson, Jr. ............................ 106/31.3 |
| 5,372,852 | 12/1994 | Titterington et al. ................... 427/288 |
| 5,621,022 | 4/1997 | Jaeger et al. ............................ 523/161 |

OTHER PUBLICATIONS

Derwent Abstract & Chem Abstract PCT Int. Appl. WO 96 15,201—Lasermaster.
Derwent Abstract GB 2294469 A—Markem Corporation.

*Primary Examiner*—Marion McCamish
*Assistant Examiner*—John J. Guarriello
*Attorney, Agent, or Firm*—Ralph D'Alessandro; William A. Simons

[57] ABSTRACT

A phase change ink composition is disclosed wherein the ink composition utilizes colorant in combination with a selected phase change ink carrier composition containing at least one hydroxy-functional fatty amide compound.

61 Claims, 3 Drawing Sheets

USE OF HYDROXY-FUNCTIONAL FATTY AMIDES IN HOT MELT INK JET INKS

DESCRIPTION OF RELATED PATENT APPLICATIONS

This is a continuation-in-part application of U.S. patent application Ser. No. 08/381,610, filed Jan. 30, 1995 now U.S. Pat. No. 5,621,022, issued Apr. 15, 1997 which is a continuation-in-part application of U.S. patent application Ser. No. 08/231,598 filed Apr. 22, 1994 now abandoned, which is a divisional application of U.S. patent application Ser. No. 07/981,677, filed Nov. 25, 1992, now U.S. Pat. No. 5,372,852, issued Dec. 13, 1994. Both this issued U.S. patent and the pending U.S. patent applications are incorporated herein by reference in their entirety.

BACKGROUND OF THE INVENTION

1. Field of the Invention

The present invention generally relates to selected phase change ink compositions containing the combination of ink colorants with certain phase change ink carrier compositions containing hydroxy-functional fatty amides.

2. Brief Description of the Related Art

In general, phase change inks are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops.

The phase change inks generally comprise a phase change ink carrier composition which is combined with a phase change ink compatible colorant. Preferably, a colored phase change ink will be formed by combining the above described ink carrier composition with compatible subtractive primary colorants. The subtractive primary colored phase change inks of this invention comprise four component dyes, namely, cyan, magenta, yellow and black. U.S. Pat. Nos. 4,889,560 and 5,372,852 teach the subtractive primary colorants employed typically may comprise dyes from the classes of Color Index (C. I.) Solvent Dyes, C. I. Disperse Dyes, modified C. I. Acid and Direct Dyes, and a limited number of C. I. Basic Dyes. Also suitable as colorants are appropriate polymeric dyes, such as those available from Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, and uncut Reactint Violet X-80.

Phase change inks are desirable for ink jet printers since they remain in a solid phase at room temperature, during shipping, long-term storage, and the like. Also, the problems associated with nozzle clogging due to ink evaporation are largely eliminated, thereby improving the reliability of ink jet printing. Furthermore, since the ink droplets solidify immediately upon contact with the substrate, migration of the ink along the printing medium is prevented and dot quality is improved. This is also true of the processes and ink compositions described herein.

U.S. Pat. No. 5,372,852 teaches that the selective phase change ink compositions described therein contain a phase change carrier composition comprising a fatty amide-containing material (either a tetra-amide compound or mono-amide or mixtures thereof). This patent further teaches the preferred tetra-amide compounds are made by reacting a fatty acid, a diamine (ethylene diamine) and a dimer acid. The preferred fatty acid is taught to be stearic acid and the preferred dimer acid a hydrogenated oleic acid dimer product known as EMPOL 1008 Dimer Acid, manufactured by the Emery Division of Henkel Corporation of Cincinnati, Ohio. The preferred mono-amides are taught to be secondary mono-amides such as behenyl benenamide and stearyl stearamide, products made under the KEMAMIDE trademark by Witco Chemical Company.

While the phase change ink compositions described by U.S. Pat. No. 5,372,852 have met with great commercial success, there is always a need to improve those inks for more demanding processing conditions and different applications.

SUMMARY OF THE INVENTION

The present invention is directed to making phase change ink compositions of the types disclosed in U.S. Pat. No. 5,372,852 and in U.S. Pat. No. 5,621,022 both assigned to the assignee of the present invention, wherein at least a portion of the fatty amide material employed therein is substituted with a hydroxy-functional fatty amide material. As used in this application non-hydroxy functional amide analogs of the hydroxy functional amides include, but are not limited to, monoamides, diamides tetra-amides and other suitable polyamides and their derivatives. It has been found the inclusion of this new material into these phase change ink compositions results in an ink composition that possesses a combination of several unexpected advantages, including:

(1) the addition of hydroxy-functional fatty amide materials increase the translucence of the ink so that the ink is almost transparent, ever in bulk;

(2) the use of hydroxy-functional materials greatly reduces or eliminates the need for an added plasticizer to the ink, while allowing the ink to remain tough and flexible after being printed on paper from an ink jet printer;

(3) the employment of hydroxy-functional materials does not substantially change the melting point of the inks, but does lower the freezing point of the ink resulting in a markedly widened super-cooling temperature range of the inks;

(4) use of these hydroxy-functional materials produces an intermediate metastable gel phase that allows the use of lower pressure during, the fusing and/or transfixing step in both direct and indirect printing (i.e. use of an intermediate transfer surface).

One aspect of the present invention is directed to a phase change ink composition comprising (1) an ink carrier composition containing a hydroxy-functional fatty amide-containing material, said hydroxy-functional fatty amide-containing material selected from the group consisting of a hydroxy-functional tetra-amide, a hydroxy-functional diamide, a hydroxy functional mono-amide, and non-hydroxy functional amide analogs and mixtures thereof and (2) a compatible colorant, said phase change ink composition being in a solid phase at ambient temperature, being in a liquid phase at elevated operating temperatures and in selected compositional proportions being in an intermediate gel state, slid ink composition having a high degree of lightness and chroma, and being rectilinearly light transmissive in a thin film of substantially uniform thickness.

A second aspect of the present invention is directed to a selective phase change ink composition, which comprises a phase change ink colorant composition and a phase change ink carrier composition, said selective phase change ink composition having (a) predetermined fluidics and mechanical properties which meet the parameters needed for application to an intermediate transfer surface at an elevated temperature in a liquid state and in a predetermined pattern, where it is transferred and fixed onto a substrate to form a printed substrate, (b) a compressive yield strength which will allow the ink to flow in a ductile manner when external compressive forces are applied thereto, and sufficient internal cohesive strength to resist failure when the ink is fixed to said substrate, (c) a high degree of ductility on said substrate after said transfer and fixing, and (d) a high degree of lightness and chroma for thin films of uniform thickness thereof, wherein said phase change ink carrier composition is selected from the group consisting of hydroxy-functional tetra-amides, diamides, hydroxy-functional diamides, hydroxy-functional mono-amides, non-hydroxy-functional amides analogs, and mixtures thereof.

A third aspect of the present invention is directed to a phase change ink composition comprising (1) a phase change ink carrier composition comprising a hydroxy-functional tetra-amide, a diamide, a hydroxy-functional diamide, a hydroxy-functional mono-amide, a non-hydroxy-functional amide analog, and mixtures thereof; and (2) a compatible colorant. The said ink composition exists in a solid phase at ambient temperature and in a liquid phase at elevated operating temperature, and having a high degree of lightness and chroma and being rectilinearly light transmissive in thin films of substantially uniform thickness, wherein the $C^*_{ab}$ value of a substantially uniform thin film of about 5–20 micron thickness of subtractive primary yellow, magenta and cyan color phase change ink compositions are at least about 50 for said yellow ink composition, at least about 50 for said magenta ink composition, and at least about 30 for said cyan ink (composition, and wherein the $L^*$ value of a substantially uniform thin film of about 5–20 micron thickness, of a black color phase change ink is not more than about 35.

BRIEF DESCRIPTION OF THE DRAWINGS

These aspects, features and advantages of the present invention will become apparent upon consideration of the following detailed description of the preferred embodiment, especially when taken in conjunction with the following drawings wherein.

BRIEF DESCRIPTION OF PREFERRED EMBODIMENTS

This invention comprises selective phase change ink compositions for use in processes by which such compositions are applied either directly or indirectly via an intermediate transfer surface to a final receiving surface or substrate. The phase change ink compositions of the instant invention comprise a specific phase change ink colorant and a specific phase change ink carrier composition. The specific phase change ink carrier compositions are formulated to produce redetermined fluidics in the liquid phase that generate a predictable uniform stream of ink droplets from the jet orifice. These ink carrier compositions as well must have mechanical properties in the solid phase that give the resulting print a tough, scratch resistant surface. Furthermore, those ink compositions used in indirect printing must have a malleable intermediate phase that allows the transfer and offset printing of the image. The transfer is accomplished by first printing on an intermediate surface and the image is offset to a final receiving substrate.

The colorants used in the phase change ink compositions of the present invention are materials compatible with the particular phase change ink carrier composition employed. The phase change inks of this invention generally comprise dyes that form the subtractive primary component colors, namely, cyan, magenta, yellow and black for full color printing. However, this does not preclude the use of any color that is compatible in the phase change inks. The dyes employed may be dyes from the following dye classes: Color Index (C. I.) Solvent Dyes; C. I. Disperse Dyes; modified C. I. Acid and Direct Dyes; and C. I. Basic Dyes.

Besides these classes of dyes the ink compositions of the present invention can also include selected polymeric dyes as one or more colorants. These polymeric dye colorants are available from Milliken Corporation. Examples include Milliken Ink Yellow 869, Milliken Ink Blue 92, Milliken Ink Red 357, Milliken Ink Yellow 1800, Milliken Ink Black 8915-67, Reactint Orange X-38, Reactint Blue X-17, and Reactint Violet X-80. Other yellow, cyan, magenta and black polymeric dyes are within the scope of this invention and may be utilized. These polymeric dyes may be used alone or in combination with conventional colorants disclosed in U.S. Pat. No. 5,372,852 to make individual phase change inks of any color. A phase change ink composition incorporating from about 0.1 to about 15 percent by weight of the colorant, preferably from about 0.5 to about 8 percent by weight, may be provided.

To facilitate understanding of the polymeric dye chemistry it is helpful to recall that polymeric dye colorants are characterized by three primary components: (1) an organic chromophore having (2) a polyoxyalkylene substituents, and optionally (3) a carboxylic acid or nonreactive derivative thereof covalently bonded to the polyoxyalkylene substituent.

A wide variety of polyoxyalkylene substituted organic chromophores and their preparation are well known in the art. These materials can be represented by the general formula:

where A is an organic chromophore, Y is a straight or branched polyoxyalkylene substituent comprised of from 1–200 radicals of $C_{2-18}$ alkylene oxides. The chromophore is covalently bonded to the polyoxyalkylene substituent by a linking group such as N, $NR_3$, O, S, $SO_2$, $SO_2N$, $SO_2NR_3$, $CO_2$, CON, or $CONR_3$ where $R_3$ is H, $C_{1-12}$ alkyl, phenyl, or benzyl. Preferably, the linking group is N, $NR_3$, O, $SO_2N$, or $SO_2NR_3$. Two polyoxyalkylene substituents may be bonded to the chromophore through a trivalent linking group. The letter "p" presents the number of polyoxyalkylene chains per chromophore and may be from 1–6, and preferably is from 1–4.

Preferably, the polyoxyalkylene substituents are primarily comprised of from 3 to 50 radicals of ethylene oxide, propylene oxide or random and block copolymers thereof.

Minor amounts of glycidol, butylene oxide, and other compatible monomers may also be present.

A wide variety of organic chromophores are suitable for use in the present invention. Examples of useful chromophores include: nitroso, nitro, azo, diarylmethane, triarylmethane, xanthene, acridine, quinoline, methine, thiazole, indiamine, indophenol, lactone, aminoketone, hydroxyketone, stilbene, azine, oxazine, thiazine, anthraquinone, phthalocyanine, azamethines or indigoid chromophore groups. Of particular interest are azo, methine, triphenylmethanes, and anthraquinone chromophores. While metal containing chromophores, such as phthalocyanines, may also be employed, from an environmental perspective, their use is less desirable.

Synthesis of organic chromophores containing polyoxyalkylene sibstituents are disclosed in Kuhn, U.S. Pat. No. 3,157,633, Brendle, U.S. Pat. No. 4,167,510, Cross et al., U.S. Pat. No. 4,284,729, and Baumgartner et al., U.S. Pat. No. 4,732,570, incorporated by reference herein in their entireties.

Preferably, the polyoxyalkylene substituent has a pendant or terminal nucleophilic functionality selected from OH, $NHR_2$, $NHR_2$, and SH, wherein $R_2$ is $C_{1-18}$ alkyl, preferably $C_{1-8}$ alkyl, which reacts to create the bond. In a more preferred embodiment, the nucleophilic functionality is OH or $NH_2$ which is attached to a primary carbon.

The carboxylic acid or nonreactive derivative thereof may be incorporated into the colorant in a number of ways. In one embodiment, a cyclic acid anhydride is reacted with the nucleophilic functionality of the poly-oxyalkylene substituent to provide an ester, amide, or this ester bond and a pendant carboxyl group. Suitable cyclic acid anhydrides or equivalent derivatives include succinic anhydride, maleic anhydride, phthalic anhydride, trimellitic anhydride, and dimethyl succinate. In a preferred embodiment, the oleophilic character of the colorant is increased by providing an anhydride with a substituent having up to 30 carbon atoms. By way of example, the substituent may be $C_{1-30}$ alkyl, cycloalkyl, or alkenyl, phenyl, naphthyl, or benzyl. Particular useful anhydrides include: alkenyl succinic anhydrides such as octenyl succinic anhydride (OSA), dodecenyl succinic anhydride (DSSA), and octadecenyl succinic anhydride (ODSA); itaconic anhydride, citraconic anhydride, succinic anhydrides bonded to rosins and maleated rosins such as "UNIREZ" available from Union Camp Corporation of Wayne, N.J.

Alternatively, a polycarboxylic acid derivative such as a diacyl halide may be reacted with the nucleophilic functionality of the polyoxyalkylene substituents to form an ester, amide, or this ester bond and a pendant carboxyl group. Standard esterification techniques known in the art may be used followed by hydrolysis of the unreacted acyl halide to form a carboxylic acid functionality.

A further embodiment of the invention may be realized by the reaction of a polycarboxylic acid, such as malonic acid, adipic acid, and sebacic acid with the nucleophilic functionality of the polyoxyalkylene substituent to create an ester, amide or ester bond and a pendant carboxyl group.

The above-mentioned cyclic acid anhydrides, acyl halides, and dicarboxylic acids may be substituted with CN, $NO_2$, halogens, and $SO_3$ without deviating from the scope of the invention.

The colorant may be preferably represented by the formula:

where A is an organic chromophore; Y is a polyoxyalkylene substituent having from 1 to 200 alkylene oxide radicals of $C_{2-18}$ alkylene oxides; X is a nucleophile selected from O, $NR_2$, and S, where $R_2$ is H or $C_{1-18}$ alkyl; $R_1$ is selected from alkylene, alkenylene, phenylene, respectively and phenylene-alkylene, any of which may optionally be substituted with alkyl, alkenyl, or aryl, provided that the total number of carbon atoms is from 2 to 30; and p is an integer from 1 to 6.

The term "non-reactive derivative" of the pendant carboxylic acid group as defined for the present specification and claims means ester and amide derivatives of said carboxylic acids.

The phase change ink carrier composition of the present invention typically comprises a hydroxy-functional fatty amide-containing material. The fatty amide-containing material of the modified phase change ink carrier is preferably a hydroxy-functional tetra-amide compound, a hydroxy-functional mono-amide compound or mixtures thereof. The preferred hydroxy-functional tetra-amide compounds for producing the modified phase change ink carrier composition are dimer acid-based tetra-amides which preferably include the reaction product of a hydroxy-functional fatty acid, a diamine e.g. (ethylene diamine) and a dimer acid. It is theorized that the reaction product of a fatty acid, a diamine (e.g. ethylene diamine) and a hydroxy-functional dimer acid can also produce the desired modified phase change ink carrier composition of the present invention. As used in the present specification, the term "hydroxy-functional fatty amide-containing material" refers to a compound having hydroxy groups and a fatty amide moiety. A preferred hydroxy-functional fatty acid precursor is 12-hydroxy stearic acid. For purposes of this invention, the term "dimer acid" preferably means a hydrogenated oleic acid dimer product. A preferred example of such a dimer acid is a product known as Empol 1008 Dimer Acid, manufactured by the Emery Division of Henkel Corporation of Cincinnati, Ohio. Fatty acids having from 10 to 22 carbon atoms are preferably employed in the formation of the dimer acid-based tetra-amide. A preferred example of a dimer acid-based tetra-amide is a product known as Unirez 2970 manufactured by Union Camp Corporation and comprises the reaction product of ethylene diamine, dimer acid, and stearic acid in the stoichiometric ratio of 1:2:2.

The hydroxy-functional fatty amide-containing material may also preferably comprise a hydroxy-functional mono-amide. In fact, in the preferred case, the phase change ink carrier composition comprises both a hydroxy-functional tetra-amide compound and a hydroxy-functional mono-amide compound. The hydroxy mono-amide compound typically comprises a secondary mono-amide. However, a primary mono-amide, such as 12-hydroxy stearamide, can be employed herein. Hydroxy-functionalized stearyl stearamides are useful secondary mono-amides.

The preferred hydroxy-functional fatty amide-containing compounds of this invention comprise a plurality of fatty amide materials which are compatible with each other. Typically, even when a plurality of hydroxy-functional fatty amide-containing compounds are employed to produce the phase change ink carrier composition, the carrier composition has a substantially single melting point transition. The melting point of the phase change ink carrier composition is preferably at least about 85° C.

The preferred phase change ink carrier composition comprises a hydroxy-functional tetra-amide and a hydroxy-functional mono-amide. The weight ratio of the hydroxy-functional tetra-amide to the hydroxy-functional mono-amide in the preferred instance is from about 2:1 to about 1:10, and more preferably, from about 1:1 to about 1:5.

Various modifying agents can be added to a phase change ink carrier composition. However, only certain of these modifying agents which are employed in a manner which will produce a phase change ink composition having the properties which meet the parameters required for indirect application to the substrate fall within the scope of this invention. For example, a preferred modifying agent includes certain tackifiers. The preferred tackifiers encompass those which are compatible with fatty amide-containing materials. These include, for example, KE-311 Resin, a glycerol ester of hydrogenated abietic (rosin) acid made by Arakawa Chemical Industries, Ltd., Foral 85, a glycerol ester of hydrogenated abietic (rosin) acid, Foral 105, a pentaerythritol ester of hydroabietic (rosin) acid, Cellolyn 21, a hydroabietic(rosin) alcohol ester of phthalic acid, all manufactured by Hercules Chemical Company, Nevtac 2300 and Nevtac 80, synthetic polyterpene resins manufactured by Neville Chemical Company, and Wingtack 86, a modified synthetic polyterpene resin manufactured by Goodyear Chemical Company. The most preferred tackifier, however, is KB-311.

Another of the preferred modifying agents which can be added to the formulation are certain plasticizers. For instance, many of the phthalate ester plasticizers sold by Monsanto under the traded name "Santicizer" are suitable for this purpose. However, the preferred plasticizer is Santicizer 278, which is the mixed di-ester of phthalic acid with benzyl alcohol and "Texanol".

Other additives may be combined with the phase change ink carrier composition. In a typical phase change ink chemical composition antioxidants are added for preventing discoloration of the carrier composition. The preferred antioxidant materials can include Irganox 1010 manufactured by Ciba Geigy; and Naugard 76, Naugard 445, Naugard 512, and Naugard 524 manufactured by Uniroyal Chemical Company. However, the most preferred antioxidant is Naugard 445.

Viscosity reducing agents may also be employed in the ink compositions of the present invention. Use of a viscosity reducing agent allows the viscosity of the ink composition to be adjusted to a desired value. Suitable viscosity reducing agents for use in ink compositions of the present invention include stearamide, stearyl stearamide (Kemanide S-180), stearylethanolamide stearate, ethylene glycol distearate (EGDS), and N-stearoyl ethanolamide available commercially as Mackamide SMA from McIntyre Group Ltd. of University Park, Il. The viscosity reducing agent may be present in an amount of from about 0 to about 50% by weight of the ink composition. Again, the specific amount of viscosity reducing agent used in a given ink composition depends on the viscosity desired by the user.

A hardening agent may also be used in the ink compositions of the present invention to obtain ink having a desired hardness at room temperature. Useful hardening agents include ricinoleamides, hydroxystearamides, hydrogenated castor oil, EGDS, esters of methylene glycol, esters of propylene glycol, esters of ethylene glycol, esters of glycerol, stearyl esters of 12-hydroxystearic acid, and hydroxy acids, such as 12-hydroxydodecanoic acid and derivatives thereof.

Ricinoleamides and hydroxystearamides are employable as a hardening agent, with N(2-hydroxyethyl)-12-hydroxystearamide (trademark Paricin 220 from CasChem, Inc.) being most preferred. Other suitable hydroxystearamides include Paricin 210, and the diamide Paricin 285, available from CasChem, Inc. of Bayonne, N.J. These compounds substantially harden the ink composition at room temperature. The hardener, where desired and needed, may be present in an amount from 0% to about 50% by weight of the ink composition.

Although neither a viscosity reducing agent nor a hardening agent need be employed in the ink composition of the present invention, one or both are preferably employed.

While the modifying agents mentioned above are used for the preferred embodiments of this invention, other materials with similar properties can be combined with or used to produce different phase change ink compositions with mechanical and fluidics properties similar to those outlined above. These other materials can include paraffins, microcrystalline waxes, polyethylene waxes, ester waxes, oligomers or low molecular weight polymers and copolymers such as ethylene/vinyl acetate (EVA), ethylene/acrylic acid copolymers, EVA/acrylic acid copolymers, ionomers, copolymers of acrylic acid with polyamides, and the like.

In a preferred case, the phase change ink carrier composition comprises a hydroxy-functional tetra-amide and a hydroxy-functional mono-amide and a modifying agent which includes a tackifier, a plasticizer, and an antioxidant. The preferred compositional ranges of this phase change ink carrier composition are as follows: from about 10 to about 50 weight percent of a hydroxy functional tetra-amide, from about 30 to about 80 weight percent of a hydroxy-functional mono-amide, from about 0 to about 40 weight percent of a tackifier, from about 0 to about 30 weight percent of a plasticizer and about 0 to about 2 percent of an antioxidant.

Thin films of uniform thickness of the phase change ink composition on the final receiving substrate when cooled to the ambient temperature must be ductile and retain sufficient flexibility so the image will not fracture upon bending, while possessing a high degree of lightness, chroma, transparency and thermal stability.

It has been determined in an indirect application process employing an intermediate transfer surface that a phase change ink composition must have certain fluidics and mechanical properties in order to produce a printed substrate of high quality. These desirable properties of the phase change ink compositions of this invention in the solid state are specified and measured by using several analytical techniques. One such technique is dynamic mechanical analyses (DMA). DMA is a technique capable of measuring the viscoelastic properties of a material and identifying the material's elastic and viscous components. The measurements are made by subjecting the ink composition to an alternating (oscillatory or dynamic) strain and simultaneously measuring the alternating stresses and phase angles at different frequencies and temperatures. The dynamic stress($s^*$) of an ink composition can be separated into two components. These are the "elastic stress" component which is the magnitude of the portion of the applied force in phase with the applied strain, and the "viscous stress" component, which is the magnitude of the portion of the applied force out of phase with the applied strain. The dynamic modulus ($E^*$) can be determined from the ratio of dynamic stress over strain. Correspondingly, it can be broken down into the in-phase component of the modulus, $E'$, and the out-of-phase component of the modulus, $E''$. $E'$ defines the energy stored in a specimen under an applied strain. $E'$ is determined by the equation $E'=s_o/E_o(Cos\delta)$. $E''$ defines the energy loss due to viscous dissipation under an applied strain. $E''$ is determined by the equation $E''=s_o/E_o(Sin\delta)$.

The phase angle ($\delta$) is the lag in the measured stresses to an applied strain due to the viscoelastic nature of the material. The loss tangent (tan $\delta$) is the ratio of loss modulus over storage modulus. Tan $\delta$ is often referred to as the dissipation (damping) factor, i.e., the ratio of energy dissipated per cycle to the maximum potential energy stored during a cycle. Finally, the glass transition temperature ($T_g$) is a temperature at which there is a $T_g$, the drop in modulus, about 0.5 to about 3 orders of magnitude, accompanied by a definite peak of the tan δ. Below the $T_g$, the material behaves like a brittle solid. At the $T_g$, the material acts like a leathery solid and is capable of dissipating energy. Above the $T_g$, the material is similar to a rubbery solid. Dynamic properties are usually plotted in terms of E', E" and tan δ as a function of temperature at a constant frequency or as a function of frequency at a constant temperature. Through the time-temperature equivalence principle discussed in the book entitled, "Viscoelastic Properties of Polymers", Chapter 11, pages 264–320, 3rd Edition by John D. Ferry, it is understood that the effect of changing temperature will correspond to a shift along the frequency axis for all relaxation process, without appreciable change in magnitude of all of these relaxation processes.

Another of the mechanical analytical techniques mentioned above is compressive yield testing on bulk samples of the phase change ink compositions. Yield stress is the point on the stress-strain curve at which the material continues to deform without an increase in stress. This is important in the printing process mentioned above since it determines the pressure need to spread the solid, malleable ink droplets into a continuous thin film during the transfer process.

There are various types of deformation the ink undergoes in compression as a function of temperature or rate. An ink can be classified as being brittle if it fails by the shearing and fracturing of the molecular bonds. This is typified by low elongation (which is directly proportional to strain) and moderate to high stress. Since the integration of the area under the stress-strain curve is a measure of the toughness of the material, a brittle material is strong, but not tough. The brittle behavior is detrimental to the durability of the ink on substrates because it is both low in elongation (i.e., not very ductile or flexible ) and toughness (i.e., the ability to dissipate energy).

An ink is considered to be ductile if it fails by sliding the molecules over each other and flowing. This is typified by high elongation and toughness. Ductile behavior is desirable for a printing process involving transfer and fusing or fixing because it allows the ink to spread by flowing under an applied pressure without fracturing.

Shear banding is the transition between the ductile and weak behavior, where the ink loses its cohesive strength. Shear bans are typified by 45° angle criss-crossed bands that indicate the ink is weakening. Weak behavior is characterized by the crumbling behavior of the ink. This is due to the loss in cohesive strength of the material. It is theorized that this occurs once short molecules have flowed past one another at high elongation. The weak behavior is to be avoided during the image transfer and fusing steps because it leads to poor durability of the ink on substrates, poor rectilinear light transmission of the ink, and poor transfer efficiency during printing.

The phase change ink compositions as finally applied to the substrate make a finished print exhibiting excellent color properties. Thin films of uniform thickness of the phase change ink composition are recilinearly light transmissive and exhibit exemplary C*ab and L* values as hereinafter described.

Another important property of phase change in inks is viscosity. The viscosity of the molten ink must be matched to the requirements of the ink jet device and optimized versus other physical properties of the ink. For purposes of this invention, the viscosity of the phase change ink is measured on a Bohlin CS-50 rheometer using a C-25 cup and bob. It is preferred that the viscosity of the phase change ink carrier composition at 140° C., and in turn the ink composition of this invention, is from about 5 to about 30 centipoise, ore preferably from about 10 to about 20 centipoise, and most preferably from about 11 to about 15 centipoise.

As previously indicated, the subject phase change ink formed from the phase change ink carrier composition exhibit excellent physical properties. For example, the subject phase change ink, unlike prior art phase change inks, exhibits a high level of lightness, chroma, and rectilinear light transmissivity when utilized in a thin film of substantially uniform thickness, so that color images can be conveyed using overhead projection techniques. Furthermore, the preferred phase change ink compositions exhibit the preferred mechanical and fluidics properties mentioned above when measured by DMA, compressive yield testing and viscometry, and more importantly, work well when used in the indirect printing process described in co-pending U.S. Pat. No. 5,389,958 issued Feb. 14, 1995 assigned to the assignee of the present invention. This patent is incorporated herein by reference in its entirety.

The transmission spectra for each of the phase change inks used in the process of this invention were evaluated on a commercially available spectro-photometer, the ACS Spectro-Sensor II, in accordance with the measuring methods stipulated in ASTM IE805 (Standard Practice of Instrumental Methods of Color or Color Difference Measurements of Materials) using the appropriate calibration standards supplied by the instrument manufacturer. For purposes of verifying and quantifying the overall calorimetric performance of thinks used in the process and as a part of this invention, measurement data were reduced, via tristimulus integration, following ASTM E308 (Standard Method or Computing the Colors of Objects using the CIE System) in order to calculate the 1976 CIE L* (Lightness), a* (redness-greenness), and b* (yellowness-blueness) CIELAB values for each phase change ink sample. In addition, the values for CIELAB Psychometric Chroma, $C^*_{ab}$, and CIELAB Psychometric Hue Angle, were calculated according to publication CIE15.2, Colorimetry (Second Edition, Central Bureau de la CIE, Vienna, 1986).

Unlike conventional phase change ink carriers, he nature of the phase change ink used in the process of the present invention is such that thin films of substantially uniform thickness exhibit a relatively high L* value. For example, a substantially uniform thin film of about 5–20 micron thickness of the phase change ink of this invention preferably has an L* value of at least about 65, more preferably at least about 75, and most preferably at least about 85.

The phase change inks used herein have a relatively high C*ab value when measured as a thin film of substantially uniform thickness. Previously, conventional phase change inks have had a very low degree of rectilinear light transmissivity, even in thin films of substantially uniform thickness. The phase change ink composition used in the process of this invention has C*ab values, when applied as a substantially uniform thin film of bout 5–20 micron thickness with subtractive primary yellow, magenta and cyan color phase change ink compositions, that preferably are at least about 40 for said yellow ink composition, at least about 65 for said magenta ink composition, and at least about 30 for the cyan ink composition.

It is also important that the black color phase change ink component be at a minimum light transmissivity level so that the color intensity of the ink is maximized. Accordingly, the L* value of a substantially uniformly thin film of about 5–20 microns thickness of a black color phase change ink is preferably not more than about 35, more preferably not more than about 30, and most preferably not more than about 25.

The respective phase change ink and ink carrier compositions, when transferred to the final substrate in a thin film, are quite durable. One indication of durability is abrasion resistance. For purposes of this invention, abrasion resistance is determined by testing a finished print sample of the phase change ink produced from the carrier composition in a Teledyne Taber Abrader, Model 5130, utilizing CS-230 Abrasion wheels loaded with 500 gram weights. The abrasion wheels are resurfaced after each sample with an S-11 resurfacing disk. Samples printed on paper were tested according to ASTM D406 (F84 (Standard Test Method For Abrasion Resistance of Organic Coatings by the Taber Abrader).

Samples printed on light transmissive thin films were tested using ASTM D1304Q-85 (Standard Test Method For Resistance of Transparent Plastics to Surface Abrasion). Print samples were tested as described above, and the results of those tests demonstrated excellent abrasion resistance.

A further test employed to evaluate the durability of phase changed inks and ink carrier compositions is an offset transfer or blocking test. This determines whether the phase change ink printed on a substrate will adhere to an adjacent stacked one on top of the other. The blocking test is conducted using an indirect transfer method by printing samples of the phase change ink produced from the carrier compositions onto a paper or thin film substrate and placing that substrate in a manila folder under a one pound piece of num, about 8.5 inches wide and about 11 inches long to evenly distribute the weight of a 10 pound block. These printed samples are placed in an oven for 24 hours at a constant temperature of about 60° C. Print samples of the phase change ink of the present invention, subjected to the above described blocking test showed no blocking.

The above-defined DMA properties of the phase change ink compositions were experimentally determined. These dynamic measurements were done on the Rheometrics Solids Analyzer (RSA II) manufactured by Rheometrics, Inc. of Piscataway, N.J., using a dual cantilever beam geometry. The dimensions of the sample were about 2.0±1.0 mm thick, about 6.5±0.5 mm wide, about 54.0±1.0 mm long. A time/cure sweep was carried out under a desired force oscillation or testing frequency of about 1 Hz and an auto-strain range of about $1.0 \times 10^{-5}\%$ to about 1%. The temperature range examined was about –60° to about 90° C. The preferred phase change ink compositions typically are (a) ductile or flexible at a temperature of about –10° to about 80° C., (b) have a temperature range for the glassy region from about –100° to 40° C., the value of E' being from about $1.5 \times 10^9$ to $1.5 \times 10^{11}$ dynes/cm$^2$, (c) have a temperature range for the transition region from about –50° to about 60° C., (d) have a temperature range for the rubbery region of E' from about –10° to 100° C., the value of E' being from about $1.0 \times 10^6$ to about $1.0 \times 10^{11}$ dynes/cm$^2$, and (e) have a temperature range for the terminal region of E' from about 30° to about 160° C. Furthermore, the glass transition temperature range of the phase change ink compositions are from about –40° to about 40° C., the temperature range for integrating under the tan δ peak of the phase change ink composition is from about –80° to about 80° C. with integration values ranging from about 5 to about 40, and the temperature range for the peak value of tan δ of the phase change ink is from about –40° to about 40° C. with a tan δ of about $1.0 \times 10^{-2}$ to about $1.0 \times 10$ at peak.

The ink utilized in the process and system of the instant invention is preferably initially in solid form and is then changed to a molten state by the application of heat energy to raise the temperature from about 85° C. to about 150° C. Elevated temperatures above this range will cause degradation or chemical breakdown of the ink. The molten ink is then applied in raster fashion from the ink jets in the print head to the exposed surface of the liquid layer forming the intermediate transfer surface, where it is cooled to an intermediate temperature and solidifies to a malleable state in which it is transferred to the final receiving surface via a contact transfer by entering the nip between the pressure and fusing roller and the liquid layer forming the intermediate transfer surface on the support surface or drum. This intermediate temperature where the solidified ink is maintained in its malleable state is between about 30° C. to about 80° C.

Once the solid malleable ink image enters the nip, it is deformed to its final image conformation and adheres or is fixed to the final receiving substrate either by the pressure exerted against ink image on the final receiving substrate by the pressure and fusing roller alone, or by the combination of the pressure and heat supplied by appropriate heating apparatus. Additional heating apparatus could optionally be employed to supply heat to facilitate the process at this point. The pressure exerted on the ink image is between about 10 to about 2000 pounds per square inch (psi), more preferably between about 500 to about 1000 psi, and most preferably between about 750 to about 850 psi. The pressure must be sufficient to have the ink image adhere to the final receiving substrate and be sufficiently deformed to ensure that light is transmitted through the ink image rectilinearly or without significant deviation in its path from the inlet to the out et, in those instances when the final receiving substrate is a transparency. Once adhered to the final receiving substrate, the ink image is cooled to ambient temperature of about 20° to about 25° C. The ink comprising the ink image must be ductile, or be able to yield or experience plastic deformation without fracture when kept above the glass transition temperature. Below the glass transition temperature the ink is brittle. The temperature of the ink image in the ductile state is between about –10° C. and to about the melting point, or less than about 85° C.

The coefficient of friction of the ink can affect the ability to perform automatic document feed printed substrates with some imaging apparatuses, such as xerographic or electrophotographic copiers. A high coefficient of friction makes the ink "stickier" and tends to cause the printed media to jam as the media slides across the supporting surface, such as glass. The coefficient of friction is defined as the ratio of the tangential force to the normal load when the surface of the material is moved relative to another surface. For a printed substrate at rest on a supporting surface, the coefficient of friction should be less than about 0.7 and preferably less than about 0.5 to permit reliable document feeding at the normal operating temperature.

The following examples are illustrative of the phase change ink formulations that can be successfully employed in direct printing or indirect transfer printing, both with and without a liquid intermediate transfer surface, without any intent to limit the invention to the specific materials, process or structure employed. All parts and percentages are by weight unless explicitly stated otherwise.

It should be noted that while 12-hydroxy stearyl stearamide has previously been available from CasChem Inc. under the trade name "Paricin 210", the product is now obsolete and in the following examples the compound was synthesized by the method given below. The "tetra-amide" based on 12-hydroxy stearic acid was also synthesized as shown in Example 2. These ingredients were combined and used in inks as shown in the subsequent Examples.

EXAMPLE 1

(Preparation of 12-hydroxy stearyl stearamide)

In a 1 liter "resin flask" about 358 grams of stearyl amine (Sigma Chemical) and about 400 grams of 12-hydroxy stearic acid (CasChem, Inc.) were combined. The mixture was melted together at a temperature of about 100° C. under nitrogen and with mechanical stirring. After melting was complete, the temperature was raised to about 200° C. over the period of about 1 hour. The water evolved from the reaction was collected by means of a Claisen head and condenser attached to the flask. After the evolution of water slowed, a vacuum line was attached and a vacuum was applied to the reaction mixture for the period of about ½ hour. The molten product was then cooled to about 120° C. and poured into 40 gram blocks using an aluminum mold. A yield of 98% (720 grams) of product was obtained. This demonstrates the ability to synthesize a monoamide with a hydroxy functional group, although it is no longer commercially available.

EXAMPLE 2

(Synthesis of "tetra-amide" using 12-hydroxy stearic acid)

In a 1 liter "resin flask" about 450 grams of 12-hydroxy stearic acid (CasChem, Inc.) and about 384.2 grams of "Dimer acid" (Emory Chemical Impol 1010) were combined. The acids were melted together under nitrogen at about 100° C. After cooling to about 86° C., about 82.7 grams of ethylene diamine (Aldrich) were added. This caused a noticeable exotherm in the reaction mixture. The mixture was heated over a period of about 2 hours to about 200° C. while being mechanically stirred. The flask had been fitted with a Claisen head and condenser to collect the water evolved. After the evolution of water slowed, a vacuum was applied for the period of about ½ hour. The mixture was then cooled under vacuum to about 150° C. and poured onto aluminum foil to form a sheet of the final resin. This demonstrates the ability to synthesize a tetra-amide with a hydroxy functional group.

EXAMPLE 3

Cyan-tinted ink base containing mixture of hydroxy stearyl stearamide with non-hydroxy tetra-amide)

In a stainless steel beaker about 98 grams of the material from Example 1, about 36 grams of Union Camp "Unirez 2970" tetra-amide, about 66 grams of Arakawa KE-100 resin and about 0.4 grams of Naugard 445 anti-oxidant were combined. The materials were melted together at a temperature of about 140° C. in an oven and then blended by stirring in a temperature controlled mantle at about 115° C. for about ½ hr. To this mixture was added about 0.5 grams of Solvent Blue 44. After stirring for about ½ hour, the cyan-tinted ink base was filtered through a heated Mott apparatus (available from Mott Metallurgical) using #3 Whatman filter paper and a pressure of 15 pounds per square inch (psi). The filtered phase change ink was poured into molds and allowed to solidify to form ink sticks. This example tests the effect of an ink base, or phase change ink carrier composition, having as a component a monamide with a hydroxy functional group and distinguishes the ink base by the addition of a slight tint so it is visible on paper.

EXAMPLE 4

(Cyan-tinted ink base using commercial stearyl stearamide and hydroxy-functional tetra-amide)

In a stainless steel beaker about 98 grams of Witco S-180 stearyl stearamide, about 36 grams of the material from Example 2, about 66 grams of Arakawa KE-100 resin and about 0.4 grams of Naugard 445 anti-oxidant were combined. The materials were melted together at a temperature of about 140° C. in an oven and then blended by stirring in a temperature controlled mantle at about 115° C. for about ½ hour. To this mixture was added about 0.5 grams of Solvent Blue 44. After stirring for about ½ hour, the cyan tinted ink base was filtered through a heated Mott apparatus (available from Mott Metallurgical) using #3 Whatman filter paper and a pressure of about 15 psi. The filtered phase change ink was poured into molds and allowed to solidify to form ink sticks. This example tests the effect of an ink base, or phase change ink carrier composition, having as a component a tetra-amide with a hydroxy functional group and distinguishes the ink base by the addition of a slight tint so it is visible on paper.

EXAMPLE 5

Cyan-tinted ink base using hydroxy-functional stearyl stearamide and hydroxy-functional tetra-amide)

In a stainless steel beaker about 98 grams of the material from Example 1, about 36 grams of the material from Example 2, about 66 grams of Arakawa KE-100 resin and about 0.4 grams of Naugard 445 anti-oxidant were combined. The materials were melted together at a temperature of about 140° C. in an oven and then blended by stirring in a temperature controlled mantle at about 115° C. for about ½ hour. To this mixture was added about 0.5 grams of Solvent Blue 44. After stirring for about ½ hour, the cyan-tinted ink base was filtered through a heated Mott apparatus (available from Mott Metallurgical) using #3 Whatman filter paper and a pressure of about 15 psi. The filtered phase change ink was poured into molds and allowed to solidify to form ink sticks. This example tests the effect of an ink base, or phase change ink carrier composition, having as components both a monoamide with a hydroxy functional group and a tetra-amide with a hydroxy functional group and distinguishes the ink base by the addition of a slight tint so it is visible on paper.

EXAMPLE 6

(Yellow ink using hydroxy-stearyl amides and polymeric dye)

In a stainless steel beaker about 118.7 grams of the material from Example 1, about 32.4 grams of the material from Example 2, about 64.7 grams of Arakawa KE-100 resin and about 0.4 grams of Naugard 445 anti-oxidant were combined. The materials were melted together at a temperature of about 140° C. in an oven and then blended by stirring in a temperature controlled mantle at about 115° C. for about ½ hour. To this mixture was added about 9.7 grams of Milliken Chemical "869" polymeric yellow dye. After stirring for about ½ hour, the ink was filtered through a heated Mott apparatus (available from Mott Metallurgical) using #3 Whatman filter paper and a pressure of 15 psi. The filtered phase change ink was poured into molds and allowed to solidify to form ink sticks. This example creates a phase change ink having as components both a monoamide with a hydroxy functional group and a tetra-amide with a hydroxy functional group using a polymeric colorant.

EXAMPLE 7

(Magenta ink using hydroxy-stearyl amides)

In a stainless steel beaker about 117.7 grams of the material from Example 1, about 32.1 grams of the material from Example 2, about 64.2 grams of Arakawa KE-100 resin and about 0.4 grams of Naugard 445 anti-oxidant were combined. The materials were melted together at a temperature of about 140° C. in an oven then blended by stirring in a temperature controlled mantle at about 115° C. for about ½ hour. To this mixture was added about 3.2 grams of Solvent Red 49 and about 1.2 grams of Solvent Red 172. After stirring or about ½ hour, the ink was filtered through a heated Mott apparatus (available from Mott Metallurgical) using #3 Whatman filter paper and a pressure of 15 psi. The filtered phase change ink was poured into molds and allowed to solidify to form ink sticks. This example creates a phase change ink having as components both a monoamide with a hydroxy functional group and a tetra-amide with a hydroxy functional group using a combination of red dyes as the colorant.

EXAMPLE 8

(Cyan ink using hydroxy-stearyl amides)

In a stainless steel beaker about 115.9 grams of the material from Example 1, about 31.6 grams of the material from Example 2, about 63.2 grams of Arakawa KE-100 resin and about 0.4 grams of Naugard 445 anti-oxidant were combined. The materials were melted together at a temperature of about 140° C. in an oven and then blended by stirring in a temperature controlled mantle at about 115° C. for about ½ hour. To this mixture was added about 4.6 grams of Solvent Mott apparatus (available from Mott Metallurgical) using #3 Whatman filter paper and a pressure of 15 psi. The filtered phase change ink was poured into molds and allowed to solidify to form ink sticks. This example creates a phase change ink having as components both a monoamide with a hydroxy functional group and a tetra-amide with a hydroxy functional group using a cyan dye as the colorant.

EXAMPLE 9

(Black ink using hydroxy-stearyl amides)

In a stainless steel beaker about 118.7 grams of the material from Example 1, about 31.6 grams of the material from Example 2, about 63.2 grams of Arakawa KE-100 resin and about 0.4 grams of Naugard 445 anti-oxidant were combined. The materials were melted together at a temperature of about 140° C. in an oven and then blended by stirring in a temperature controlled mantle at about 115° C. for about ½ hr. To this mixture was added about 5.4 grams of Solvent Black 35. After stirring for about ½ hour, the ink was filtered through a heated Mott apparatus (available from Mott Metallurgical) using #3 Whatman filter paper and a pressure of 15 psi. The filtered phase change ink was poured into molds and allowed to solidify to form ink sticks. This example create a phase change ink having as components both a monoamide with a hydroxy functional group and a tetra-amide with a hydroxy functional group using a black dye as the colorant.

TEST OF ABOVE EXAMPLES

The tinted ink bases described in Examples 3, 4, and 5 were made to observe the properties of the base without added dye when printed in a Phaser® 340 printer. They were tinted with cyan dye so as to be visible on paper after printing. They were placed in a Phaser® 340 color printer and applied from an ink jet print head heated at about 140° C. to a liquid intermediate transfer surface supported by a 4.13 inch diameter support drum. The raster printed image was contact transferred in a page-wise fashion to a sheet of Hammermill Laser Print paper by pressure in a nip formed between a fusing roller and the support drum while being maintained at a temperature of about 50° C. The image from each test ink fully transferred with good print quality. The inks from Examples 3 and 5 were found to have an unexpectedly high degree of durability, as measured by Taber abrasion testing, and an unexpectedly high degree of resistance to cracking of the ink when the sample prints were folded. This performance was unexpected because no plasticizer was used in these formulations.

The inks from Examples 6, 7, 8, and 9 were placed in a Phaser® 340 printer and applied from an ink jet print head heated at about 140° C. to a liquid intermediate transfer surface supported by a 4.13 inch diameter support drum. The raster printed image was contact transferred in a page-wise fashion to a sheet of Hammermill Laser Print paper by pressure in a nip formed between a fusing roller and the support drum while being maintained at a temperature of about 50° C. All four inks unexpectedly provided a high degree of durability, as measured by Taber abrasion testing, and an unexpectedly high degree of resistance to cracking of the ink when the sample prints were folded. The inks in these examples are tough, yet ductile on paper after printing without the use of a plasticizer in the formulation. Plasticizers are needed to provide ductility and durability in similar formulations using non-hydroxy fatty amides, such as is described in U.S. Pat. No. 5,372,852.

Print samples made from the inks of Examples 6, 7, 8, and 9 were also found be amenable to "duplex" printing when used in a Phase® 340 printer. The coefficient of friction of the printed ink layer against paper was found to be significantly lower with these print samples than with print samples from conventional plasticized phase change inks, such as are described in U.S. Pat. No. 5,372,852. This provided reliable "picking" from the paper tray of samples that had been printed on one side. The samples could then be reliably passed through the mechanism of the Phaser® 340 printer to provide samples with offset phase change ink printing on both sides (duplex printing) of the paper. Samples of text printed with these inks on the Phaser® 340 printer were also amenable to automatic document feeding in the mechanisms of commercial photocopiers.

EXAMPLE 10

This example illustrates the range of physical properties achievable by substituting the hydroxy stearyl stearamide for non-hydroxy stearyl stearamide (KEMAMIDE S-180) in representative phase change ink compositions. The ratio of ingredients for the test inks are shown in Table I.

TABLE I

|  | A | B | C | D | E | F |
|---|---|---|---|---|---|---|
| Kemamide S-180 | 50 | 40 | 30 | 20 | 10 | 0 |
| Tetra-amide | 12 | 12 | 12 | 12 | 12 | 12 |
| KE-100 | 38 | 38 | 38 | 38 | 38 | 38 |
| Hydroxy stearyl Stearamide | 0 | 10 | 20 | 30 | 40 | 50 |
| Antioxidant-445 | 0.2 | 0.2 | 0.2 | 0.2 | 0.2 | 0.2 |

The ingredients, totaling 500 grams, were added to a 1200 ml beaker and heated with stirring to a temperature of about 120° C. After a homogeneous solution was achieved, the molten phase change ink carrier composition was filtered through a heated Mott apparatus using Whatman #3 filter paper and a pressure of 15 psi. The filtrate was poured into molds and allowed to solidify to form solid ink sticks.

The viscosity of the phase change ink carriers were measured on a Ferranti-Shirley Cone and Plate viscometer with a large cone. The viscosities of the carrier formulations are reported in Table II in centipoise (cPs) as a function of temperature.

TABLE II

| Temperature (°C.) | A (cPs) | B (cPs) | C (cPs) | D (cPs) | E (cPs) | F (cPs) |
|---|---|---|---|---|---|---|
| 100 | 49.87 | 53.85 | 57.46 | 62.16 | 65.77 | 73.72 |
| 110 | 34.33 | 36.14 | 39.03 | 41.92 | 43.01 | 48.6 |
| 120 | 24.21 | 25.66 | 27.1 | 28.91 | 30.36 | 31.91 |
| 130 | 16.8 | 17.71 | 18.39 | 19.33 | 21.61 | 23.02 |
| 140 | 12.72 | 13.37 | 13.73 | 14.49 | 16.01 | 17.06 |

Figure 1:
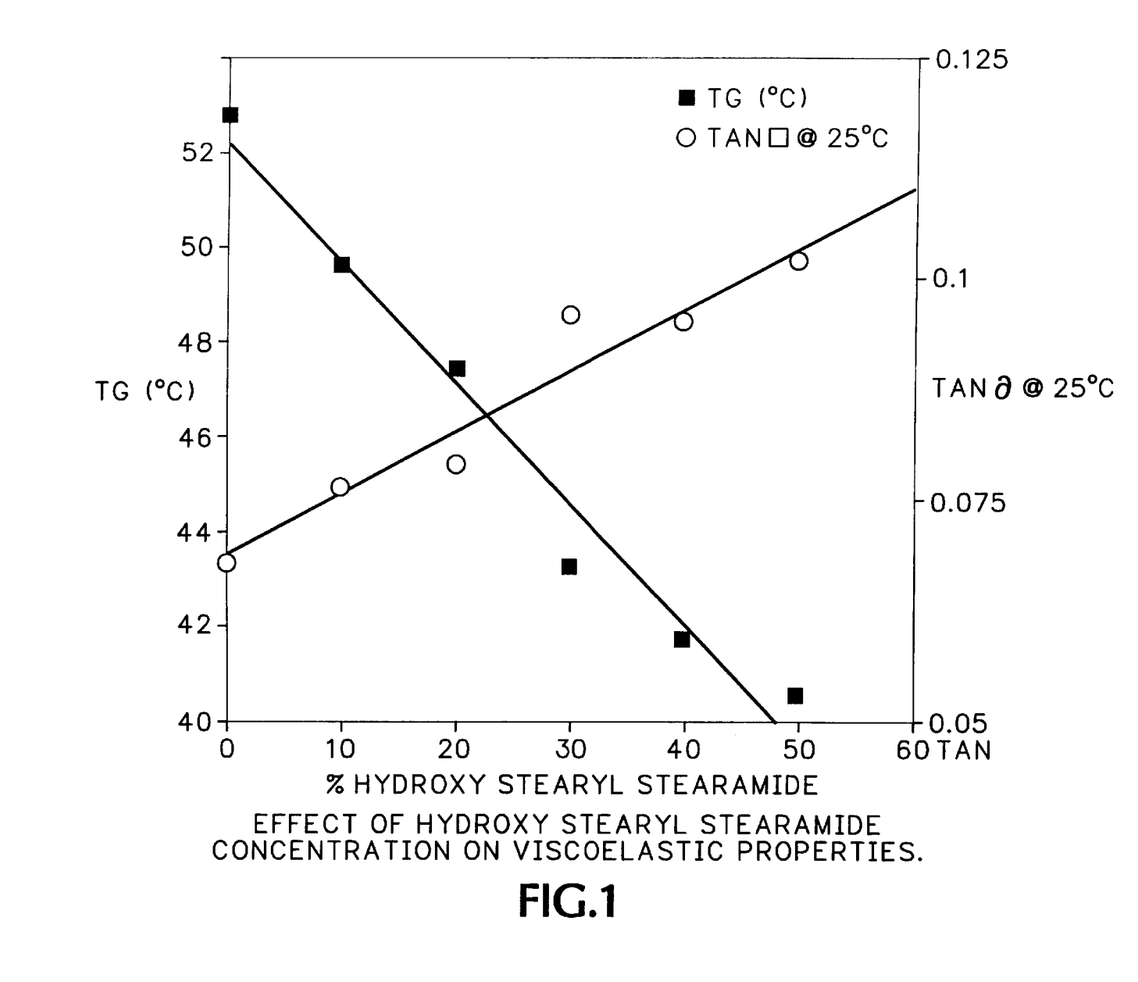
FIG. 1 is a graphical representation of the glass transition temperature and the loss tangent (Tan delta or tan δ) as a function of the percentage of hydroxy stearyl stearamide.

The viscoelastic properties of the test ink carriers were measured on the Rheometrics Solids Analyzer (RSA II) manufactured by Rheometrics, Inc. of Piscataway, N.J., using a dual cantilever beam geometry. The data are plotted in FIG. 1 showing the glass transition temperature, $T_g$, and Tan delta at 25° C. as a function of the percentage of hydroxy stearyl stearamide. The data show that the addition of hydroxy stearyl stearamide increases Tan delta and decreases the glass transition temperature.

The ink carriers were placed in a Phaser® 340 color printer and applied from an ink jet print head heated at about 140° C. to a liquid intermediate transfer surface supported by a 4.13 inch diameter support drum. The raster printed image is contact transferred in a page wise fashion to a sheet of Hammermill Laser Print paper by pressure in a nip formed between a fusing roller and the support drum while being maintained at a temperature of about 50° C. The image from each test ink fully transferred with good print quality. The unexpected resistance to flaking of the ink when the copy is folded is seen in samples C–F.

Figure 2:
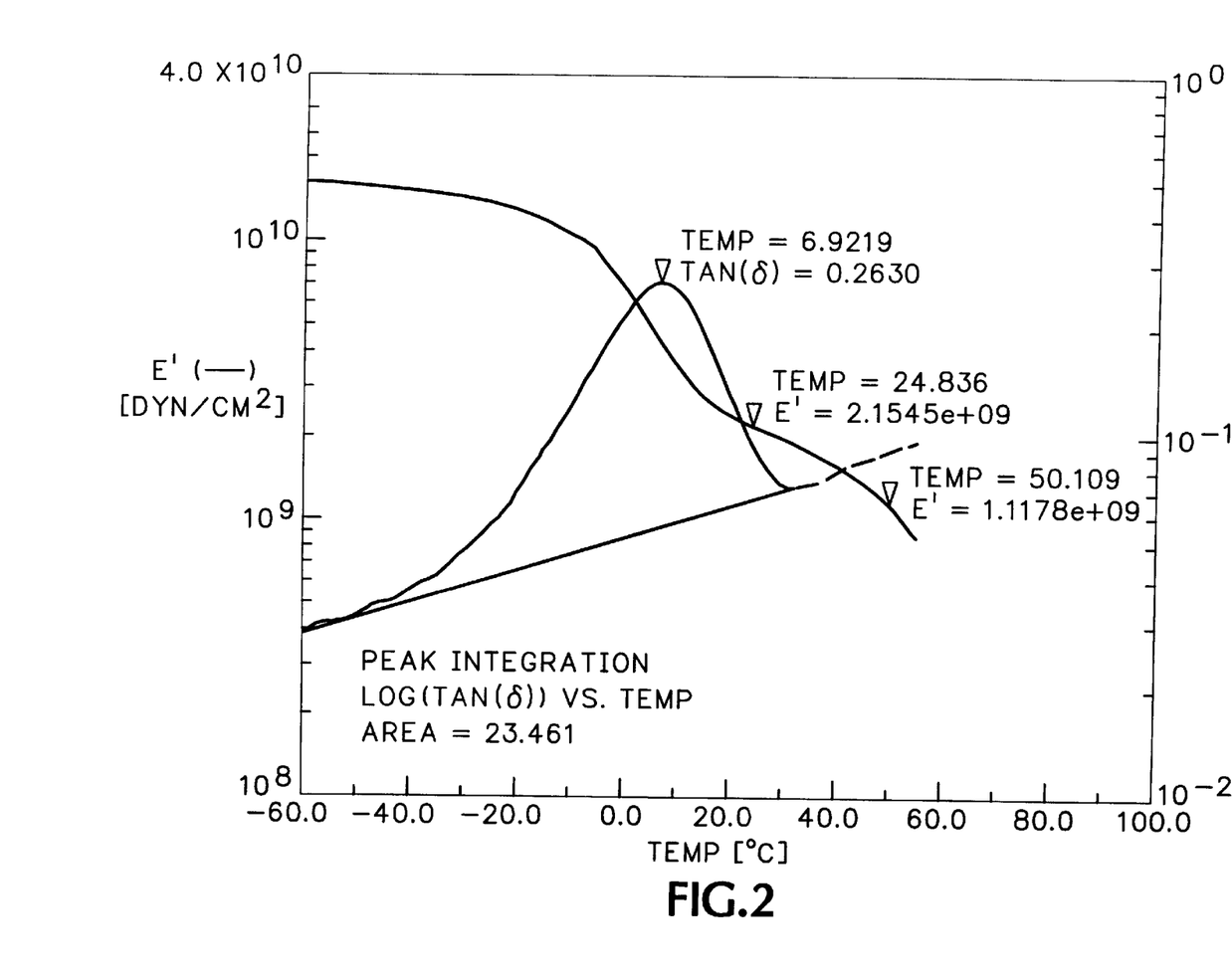
FIG. 2 is a DMA curve for a commercial phase change ink carrier composition using a tetra-amide as one of the components.

FIG. 2 illustrates graphically the Dynamic Mechanical Analyses (DMA) measurement of the viscoelastic properties of a commercial phase change ink carrier composition consisting of about 42% KEMAMIDE S-180 monoamide available from the Witco Chemical Company, about 21.5% of dimer acid-based tetra-amide manufactured and sold by Union Camp Corporation of Wayne, New Jersey, about 27% of a KE-311 Resin tackifier (a glycerol ester of hydrogenated abietic acid) manufactured and sold by Arakawa Chemical Industries, Ltd., and about 9.5% of a SANTICIZER 278 plasticizer (a mixed di-ester of phthalic acid with benzyl alcohol and "TEXANOL") manufactured and sold by the Monsanto Chemical Company. As explained earlier, this DMA curve can be used to identify the viscoelastic properties of a material, as well as to identify the elastic and viscous components of a material. In this instance the rubbery plateau beneath the tan δ peak is somewhat attenuated, indicating the relative magnitude of the temperature process window in which the indirect transfer printing can be accomplished.

Figure 3:
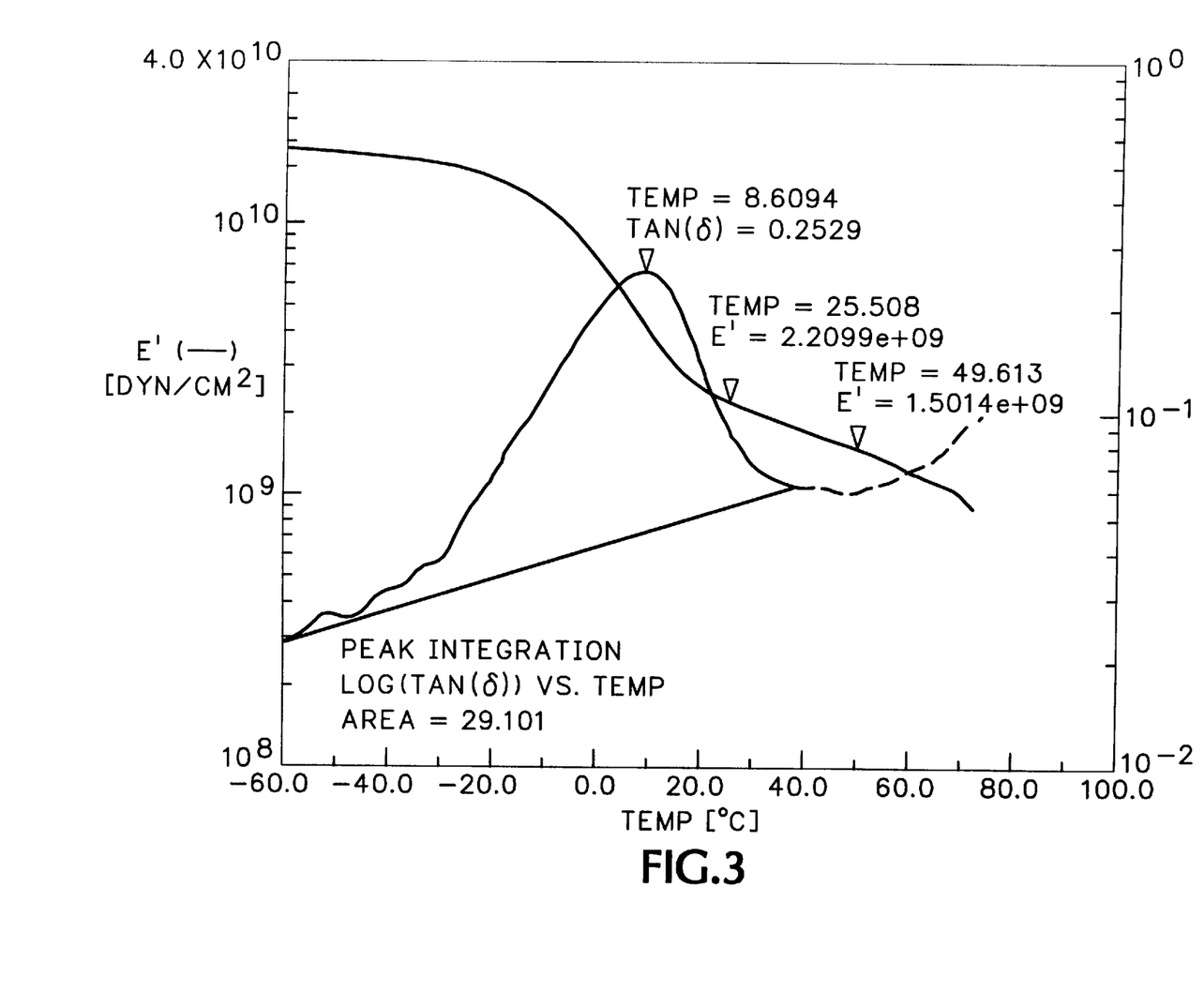
FIG. 3 is a DMA curve for a phase change ink carrier composition substituting a hydroxy functional tetra-amide in the same proportion for the tetra-amide as one of the components.

FIG. 3 illustrates graphically the Dynamic Mechanical Analyses (DMA) measurement of the viscoelastic properties of the phase change ink carrier composition of the present invention with a di-hydroxy tetra-amide of the type of material disclosed in Example 2 being substituted directly for the tetra-amide material used in the composition graphically represented in FIG. 2. The remaining components include about 42% KEMAMIDE S-180 monoamide available from the Witco Chemical Company, about 27% of a KE-311 Resin tackifier (a glycerol ester of hydrogenated abietic acid) manufactured and sold by Arakawa Chemical Industries, Ltd., about 9.5% of a SANTICIZER 278 plasticizer (a mixed di-ester of phthalic acid with benzyl alcohol and "TEXANOL") manufactured and sold by the Monsanto Chemical Company and about 0.2% of Naugard 445 antioxidant manufactured and sold by the Uniroyal Chemical Company. This DMA curve shows an extended rubbery plateau beneath the tan δ peak which is indicative of a substantially greater temperature process window in which the indirect transfer printing can be accomplished. Also the area under the peak integration of 29.101, when compared to the same area under the peak integration (23.461) of FIG. 2, reflects a much tougher or more abrasion resistant ink with the ink of the present invention employing the hydroxy functional tetra-amide.

Having illustrated and described the principles of our invention in a preferred embodiment thereof, it should be readily apparent to those skilled in the art that the invention can be modified in arrangement and detail without departing from such principles. For example, the polymeric dye colorant can be any polymeric dye compatible with said ink carrier composition. The combination of the ink carrier composition and polymeric dye can be used with either a direct print to substrate printer or an indirect transfer printer. We claim all modifications coming within the spirit and scope of the accompanying claims.

What is claimed is:

1. A phase change ink composition comprising a phase change ink carrier composition and a compatible colorant, the phase change ink carrier composition including a hydroxy-functional fatty amide-containing material wherein said hydroxy-functional fatty amide-containing material is selected from the group consisting of at least one hydroxy-functional tetra-amide compound and at least one hydroxy-functional mono-amide compound and mixtures thereof, the phase change ink carrier composition further including a non-hydroxy functional fatty amide-containing material selected from the group consisting of at least one non-hydroxy functional tetra-amide compound and at least one non-hydroxy functional mono-amide compound and mixtures thereof, said phase change ink composition being in a solid phase at ambient temperature and in a liquid phase at elevated operating temperature, said ink composition having a high degree of lightness and chroma, and being rectilinearly light transmissive in a thin film of substantially uniform thickness.

2. The phase change ink composition of claim 1 wherein said colorant is selected from the group consisting of (1) an organic chromophore having a polyoxyalkalene substitutent and (2) an organic chromophore having a polyoxyalkylene substituent and a carboxylic acid or non-reactive derivative thereof covalently bonded to the polyoxyalkylene substituent.

3. The ink composition of claim 2 wherein said colorant has the formula:

where A is an organic chromophore; Y is a polyoxyalkylene substituent having from 1 to 200 alkylene oxide radicals of C2-18 alkylene oxides; X is a nucleophile selected from O, $NR_2$, and S, where $R_2$ is H or $C_{1-18}$ alkyl; $R_1$ is selected from alkylene, alkenylene, phenylene, and phenylenealkylene which may optionally be substituted with alkyl or alkenyl, provided that the total number of carbon atoms is between 2 and 30; and p is an integer from 1 to 6.

4. The ink composition of claim 3 wherein A is selected from azo, methine, triphenylmethane and anthraquinone chromophores.

5. The ink composition of claim 4 wherein $R^1$ is selected from ethylene, vinylene and phenylene, any of which may optionally be alkyl or alkenyl substituted.

6. The ink composition of claim 5 wherein Y comprises from a total of from 3 to 50 of said alkylene oxide radicals and said alkylene oxides are selected from ethylene oxide and propylene oxide and p is 1 to 4.

7. The ink composition of claim 3 wherein A is selected from nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine, azamethine or indigoid chromophore groups.

8. The ink composition of claim 7 wherein Y comprises from a total of from 3 to 50 of said alkylene oxide radicals and said alkylene oxides are selected from ethylene oxide and propylene oxide.

9. The ink composition of claim 8 wherein $R^1$ is selected from ethylene, vinylene and phenylene, any of which may optionally be alkyl or alkenyl substituted.

10. The phase change ink composition of claim 1 wherein the phase change ink composition has a $C^*_{ab}$ value of at least about 67 of a substantially uniform thin film of a substractive primary yellow color phase change ink composition of about 5–20 micron thickness.

11. The phase change ink composition of claim 1 wherein the phase change ink composition has a $C^*_{ab}$ value of at least about 69 of a substantially uniform think film of a subtractive primary magenta color phase change ink composition of about 5–20 micron thickness.

12. The phase change ink composition of claim 1, wherein the phase change ink composition has a $C^*_{ab}$ value of at least about 40 of a substantially uniform thin film of a subtractive primary cyan color phase change ink composition of about 5–20 micron thickness.

13. The phase change ink composition of claim 1, wherein the phase change ink composition has a L* value not more than about 25 of a substantially uniform thin film of a black color phase change ink composition of about 5–20 micron thickness.

14. The phase change ink composition according to claim 1 wherein the hydroxy-functional monamide is a hydroxy functionalized stearyl stearamide.

15. The phase change ink composition according to claim 14 wherein the hydroxy functionalized stearyl stearamide is 12-hydroxy stearamide.

16. A selective phase change ink composition, which comprises a phase change ink colorant composition and a phase change ink carrier composition, said selective phase change ink composition having (a) fluidic and mechanical properties which meet the parameters needed for application to an intermediate transfer surface at an elevated temperature in a liquid state and in a printed pattern, where it is transferred and fixed onto a substrate to form a printed substrate, (b) a compressive yield strength which will allow the ink to flow in a ductile manner when external compressive forces are applied thereto, and sufficient internal cohesive strength to resist failure when the ink is fixed to said substrate, (c) a high degree of ductility on said substrate after said transfer and fixing, and (d) a high degree of lightness and chroma for thin films of uniform thickness thereof, and wherein said phase change ink carrier composition comprises a hydroxy-functional fatty amide compound of mixtures of a non-hydroxy-functional amide analog therewith.

17. The ink composition of claim 16 wherein said phase change colorant composition selected from the group consisting of (1) an organic chromophore having a polyoxyalkylene substituent and (2) an organic chromophore having an polyoxyalkylene substituent and a carboxylic acid or non-reactive derivative thereof covalently bonded to the polyoxyalkylene substituent.

18. The ink composition of claim 17 wherein said colorant composition has the formula:

where A is an organic chromophore; Y is a polyoxyalkylene substituent having from 1 to 200 alkylene oxide radicals of $C_{2-18}$ alkylene oxides; X is a nucleophile selected from O, $NR_2$ and S, where $R_2$ is H or $C_{1-18}$ alkyl; $R_1$ is selected from alkylene, alkenylene, phenylene and phenylenealkylene which may optionally be substituted with alkyl or alkenyl, provided that the total number of carbon atoms is between 2 and 30; and p is an integer from 1 to 6.

19. The ink composition of claim 18 wherein A is selected from nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine, azamethine or indigoid chromophore groups.

20. The ink composition of claim 19 wherein Y comprises from a total of from 3 to 50 of said alkylene oxide radicals and said alkylene oxides are selected form ethylene oxide and propylene oxide.

21. The ink composition of claim 20 wherein $R_1$ is selected from ethylene, vinylene and phenylene, any of which may optionally be alkyl or alkenyl substituted.

22. The ink composition of claim 18, wherein A is selected from azo, methine, triphenylmethane, and anthraquinone chromophores.

23. The ink composition of claim 22, wherein $R_1$ is selected from ethylene, vinylene, and phenylene, any of which may optionally be alkyl or alkenyl substituted.

24. The ink composition of claim 23, wherein Y comprises from a total of from 3 to 50 of said alkylene oxide radicals and said alkylene oxides are selected from ethylene oxide and propylene oxide and p is 1 to 4.

25. The ink composition of claim 16, wherein the phase change ink composition has a temperature range for the glassy region of E' from about −100 to about 40 degrees C., the value of E' being from about $1.5 \times 10^9$ to about $1.5 \times 10^{11}$ dynes/cm$^2$ at a desired testing frequency.

26. The ink composition of claim 16, wherein the phase change ink composition has a temperature range for the transition region of E' from about −50 to about 60 degrees C.

27. The ink composition of claim 16, wherein the phase change ink composition has a temperature range for the rubbery region of E' from about −10 to about 100 degrees C., the value of E' being from about $1.0 \times 10^6$ to about $1.0 \times 10^{11}$ dynes/cm$^2$ at a desired testing frequency.

28. The ink composition of claim 16, wherein the phase change ink composition has a temperature range for the terminal region of E' from about 30 to about 160 degrees C.

29. The ink composition of claim 16, wherein the L* value of a substantially uniform thin film of about 5–20 micron thickness of a black color of a phase change ink composition produced from said phase change ink composition is not more than about 35.

30. The ink composition of claim 16, wherein the thin films of uniform thickness of said phase change ink composition are rectilinearly light transmissive.

31. The ink composition of claim 14, wherein the ink composition has a $C^*_{ab}$ value of a substantially uniform thin film of about 5–20 micron thickness of a subtractive primary yellow color phase change ink composition that is at least about 40, of a subtractive primary magenta color phase change ink composition that is at least about 65, or of a subtractive primary cyan color modified phase change ink composition that is at least about 30.

32. The ink composition of claim 16, wherein the glass transition temperature range of the phase change ink composition is from about −40 to about 40 degrees C.

33. The ink composition of claim 16, wherein the temperature range for the area under the tan δ peak of the phase change ink composition is from about −80 to about 80 degrees C. with an integration area range from about 5 to about 40.

34. The ink composition of claim 16, wherein the L* value of a substantially uniform thin film of about 5–20 micron thickness of said phase change ink composition, is at least about 65.

35. The ink composition of claim 16, wherein the temperature range for the peak value of tan δ of the phase change ink is from about −40 to about 40 degrees C. with a tan δ of from about 0.01 to about 10 at peak.

36. The ink composition of claim 16 wherein under nonprocess conditions, prior to raising the temperature of said selective phase change ink composition to a first elevated operating temperature or subsequent to forming a printed substrate, the yield stress value (YS), according to the equation YS=mT+I, comprises a value as defined by m is from about −9±−2 psi/degrees C. to about −36±−2 psi/degrees C.; T is from about 10 to 60 degrees C.; and I is from about 800±100 psi to 2200±100 psi.

37. The composition of claim 36, wherein m is about −30±−2 psi/degrees C. and I is about 1700±100 psi.

38. The composition of claim 16, wherein under process conditions, from raising the temperature of said selective phase change ink composition to a first elevated operating temperature to forming a printed substrate, the yield stress value (YS), according to the equation YS=mT+I, comprises a value as defined by m which is from about −6±−2 psi/degrees C. to about −36±−2 psi/degrees C; T is from about 40 to about 80 degrees C.; and I is from about 800±100 psi to about 1600±100 psi.

39. The composition of claim 38, wherein m is about −9±−2 psi/degrees C. and I is about 950±100 psi.

40. The phase change ink composition according to claim 16 wherein the hydroxy-functional monoamide is a hydroxy functionalized stearyl stearamide.

41. The phase change ink composition according to claim 40 wherein the hydroxy functionalized stearyl stearamide is 12-hydrxoy stearamide.

42. An ink composition suitable for use with an ink jet print head comprising at least a colorant and an ink carrier composition, the ink composition being characterized by having a temperature range in the rubbery region of E' form about −10 to about 100 degrees C., a value of E' of from about $1.0 \times 10^8$ to about $1.0 \times 10^{11}$ at a desired testing frequency and a glass transition temperature range temperature of from about −40 to about 40 degrees C., where E' is determined by the equation E'=s$_o$E$_o$[Cosδ]; wherein said ink carrier composition contains a hydroxy-functional fatty amide including at least one hydroxy-functional mono-amide compound with or without a mixture of a non-hydroxy functional mono-amide compound.

43. The ink composition of claim 42 wherein said colorant is selected from the group consisting of (1) an organic chromophore having an polyoxyalkylene substituent and (2) an organic chromophore having a polyoxyalkylene substituent and a carboxylic acid or non-reactive derivative thereof covalently bonded to the polyoxyalkylene substituent.

44. The ink composition of claim 42 wherein said colorant has the formula:

where A is an organic chromophore; Y is a polyoxyalkylene substituent having from 1 to 200 alkylene oxide radicals of $C_{2-18}$ alkylene oxides; X is a nucleophile selected from O, $NR_2$ and S, where $R_2$ is H or $C_{1-18}$ alkyl; $R_1$ is selected from alkylene, alkenylene, phenylene and phenylenealkylene which may optionally be substituted with alkyl or alkenyl, provided that the total number of carbon atoms is between 2 and 30; and p is an integer from 1 to 6.

45. The ink composition of claim 44 wherein A is selected from nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine, azamethine or indigoid chromophore groups.

46. The ink composition of claim 45 wherein Y comprises from a total of from 3 to 50 of said alkylene oxide radicals and said alkylene oxides are selected from ethylene oxide and propylene oxide.

47. The ink composition of claim 46 wherein $R_1$ is selected from ethylene, vinylene and phenylene, any of which may optionally by alkyl or alkenyl substituted.

48. The ink composition of claim 47 wherein $R_1$ is selected from ethylene, vinylene and phenylene, any which may optionally be alkyl or alkenyl substituted.

49. The ink composition of claim 48 wherein Y comprises from a total of from 3 to 50 of said alkylene oxide radicals and said alkylene oxides are selected from ethylene oxide and propylene oxide and p is 1 to 4.

50. The ink composition according to claim 42, wherein the ink carrier composition is selected one from the group consisting of a low viscosity semicrystalline or crystalline amide wax, an ester wax, a polyethylene wax, a microcrystalline wax, and paraffin in combination with a hydrocarbon or resin based amorphous material, or an oligomer, or a low molecular weight polymer or copolymer, or a tackifier, or a plasticizer and combinations thereof.

51. The ink composition according to claim 42, wherein under non-process conditions, prior to raising the temperature of said selective phase change ink composition to a first elevated operating temperature or subsequent to forming a printed substrate, the yield stress value (YS), according to the equation YS=mT+I, comprises a value as defined by m which is from about −9±−2 psi/degrees C. to about −36±−2 psi/degrees C; T is from about 10 to 60 degrees C.; and I is from about 800±100 psi to 2200±100 psi.

52. The ink composition according to claim 42, wherein under process conditions from raising the temperature of said selective phase change ink composition to a first elevated operating temperature to forming a printed substrate, the yield stress value (YS), according to the equation YS=mT+I, comprises a value as defined by m which is from about −6±−2 psi. degrees C. to about −36±−2 psi. degrees C.; T is from about 40 to about 80 degrees C.; and I is from about 800±100 psi to about 1600±100 psi.

53. The phase change ink composition according to claim 42 wherein the hydroxy-functional monamide is ahydroxy functionalized stearyl stearamide.

54. The phase change ink composition according to claim 53 wherein the hydroxy functionalized stearyl stearamide is 12-hydroxy strearamide.

55. A phase change ink composition comprising a hydroxy-functional fatty amide-containing material selected from the group consisting of at least one hydroxy-functional tetra-amide compound and at least one hydroxy-functional mono-amide compound and mixtures thereof, the phase change ink carrier composition further including anon-hydroxy functional fatty amide-containing material selected from the group consisting of at least one non-hydroxy-functional amide and at least one non-hydroxy functional mono-amide compound and mixtures thereof, and a compatible colorant, said phase change ink composition being in a slid phase at ambient temperature and in a liquid phase at elevated operating temperature, said ink composition having a high degree of lightness and chroma, and being rectilinearly light transmissive in a thin film of substantially uniform thickness.

56. A selective phase change ink composition, which comprises a phase change ink colorant and a phase change ink carrier composition, said selective phase change ink composition having (a) fluidics and mechanical properties which meet the parameters needed for application to an intermediate transfer surface at an elevated temperature in a liquid state and in a desired pattern, where it is transferred and fixed onto a substrate to form a printed substrate, (b) a compressive yield strength which will allow the ink to flow in a ductile manner when external compressive forces are applied thereto, and sufficient internal cohesive strength to resist failure when the ink is fixed to said substrate, (c) a high degree of ductility on said substrate after said transfer and fixing, and (d) a high degree of lightness and chroma for thin films of uniform thickness thereof, wherein said ink carrier composition comprises a hydroxy-functional fatty amide compound or a non-hydroxy-functional amide analog mixed therewith.

57. A phase change ink composition comprising a phase change ink carrier composition comprising a compatible colorant and at least a tetra-amide compound and/or a mono-amide compound, said ink composition being solid phase at ambient temperature and in a liquid phase at elevated operating temperature, and having a high degree of lightness and chroma and being rectilinearly light transmissive in thin film of substantially uniform thickness, wherein the $C^*_{ab}$ value of a substantially uniform thin film of about 5–20 micron thickness of subtractive primary yellow, magenta and cyan color phase change ink compositions are at least about 50 for said yellow ink composition, at least about 50 for said magenta ink composition, and at least about 30 for said cyan ink composition, respectively and wherein the L* value of a substantially uniform thin film of about 20 micron thickness of a black color phase change ink is not more than about 35, wherein said ink carrier composition comprises at least one hydroxy-functional fatty amide compound or a non-hydroy-functional amide analog mixed therewith.

58. An ink composition suitable for use with an ink jet print head comprising at least a colorant and an ink carrier composition, the ink composition being characterized by having a temperature range in the rubbery region of E' from about 10 to about 100 degrees C., a value of E' of from about $1.0 \times 10^6$ to about $1.0 \times 10^{11}$ at a desired testing frequency and a glass transition temperature range temperature of from about −40 to about 40 degrees C., where E' is determined by the equation $E'=s_o/E_o (\cos\delta)$ wherein said ink carrier composition comprises at least one hydroxy-functional fatty amide compound or a non-hydroxy-functional amide analog mixed therewith.

59. A phase change ink composition comprising a phase change ink carrier composition and compatible colorant, the phase change ink carrier composition including a hydroxy-functional fatty amide-containing material wherein said hydroxy-functional fatty amide-containing material is selected from the group consisting of at least one hydroxy-functional tetra-amide compound and at least one hydroxy-functional mono-amide compound and mixtures thereof, said phase change ink composition being in a solid phase at ambient temperature and in a liquid phase at elevated operating temperature, said ink composition having a high degree of lightness and chroma, and being rectilinearly light transmissive in a thin film of substantially uniform thickness.

60. A phase change ink composition comprising a phase change ink carrier composition and a compatible colorant, the phase change ink carrier composition including at least one non-hydroxy functional mono-amide compound and a hydroxy-functional fatty amide-containing material that is at least one hydroxy-functional tetra-amide compound, said phase change ink composition being in a solid phase at ambient temperature and in a liquid phase at elevated operating temperature, said ink composition having a high degree of lightness and chroma, and being rectilinearly light transmissive in a thick film of substantially uniform thickness.

61. A phase change ink composition comprising a phase change ink carrier composition and a compatible colorant, the phase change ink carrier composition including at least one non-hydroxy functional tetra-amide compound and a hydroxy-functional fatty amide-containing material that is at least one hydroxy-functional mono-amide compound, said phase change ink composition being in a solid phase at ambient temperature and in a liquid phase at elevated operating temperature, said ink composition having a high degree of lightness and chroma, and being rectilinearly light transmissive in a thin film of substantially uniform thickness.

* * * * *